(12) United States Patent
Lee et al.

(10) Patent No.: US 7,257,636 B2
(45) Date of Patent: Aug. 14, 2007

(54) INTER-WORKING METHOD OF WIRELESS INTERNET NETWORKS (GATEWAYS)

(75) Inventors: Byung Gil Lee, Taejon (KR); Hyun Gon Kim, Taejon (KR); Chee Hang Park, Taejon (KR)

(73) Assignee: Electronics and Telecommunication Research Institute, Taejon (KR)

( * ) Notice: Subject to any disclaimer, the term of this patent is extended or adjusted under 35 U.S.C. 154(b) by 848 days.

(21) Appl. No.: 10/291,430

(22) Filed: Nov. 12, 2002

(65) Prior Publication Data

US 2003/0090998 A1 May 15, 2003

(30) Foreign Application Priority Data

Nov. 15, 2001 (KR) ................................ 2001-70946

(51) Int. Cl.
*G06F 15/16* (2006.01)
(52) U.S. Cl. ...................... 709/229; 709/220; 709/221; 709/224; 709/225; 707/101; 707/102; 707/103 R
(58) Field of Classification Search ................ 709/229; 707/101, 102
See application file for complete search history.

(56) References Cited

U.S. PATENT DOCUMENTS 6,769,000 B1 * 7/2004 Akhtar et al. ........... 707/103 R

OTHER PUBLICATIONS

Byung Gil Lee, et al.; *An AAA Application Protocol Design and Service for Secure Wireless Internet Gateway Roaming*; http://www.etri.re.kr; pp. 1-13, date not be found.
Byung Gil Lee, et al.: *Integration of AAA and Protocol for Secure Wireless Internet Roaming*; http://www.etri.re.kr; pp. 1-12, date not be found.

* cited by examiner

*Primary Examiner*—Yves Dalencourt
(74) *Attorney, Agent, or Firm*—Lowe Hauptman & Berner LLP

(57) ABSTRACT

In the inter-working method of wireless Internet (gateways) according to the present invention described above, DIAMETER which is the first version of the IETF-RFC standard of mobile IP application is applied to the application scenario based on wireless Internet gateway of a home network, not on FA or HA of Mobile IP. After all mobile communication providers connect to wireless Internet, subscribers are not bounded to the network of their mobile communication provider and have the freedom to select any external wireless Internet portal site and use the service of it. Such a wireless Internet connection method will make wireless Internet contents popular in the open wireless network epoch and provide wireless Internet contents providers with an excellent chance. The authentication of the wireless Internet gateways of other networks, authorization, accounting management, structures and techniques proposed by the present invention can give solutions to security problems of wireless internet gateway (ex WAP G/W) that have not overcome, and provide reliability to wireless Internet electronic commercial trade service.

8 Claims, 6 Drawing Sheets

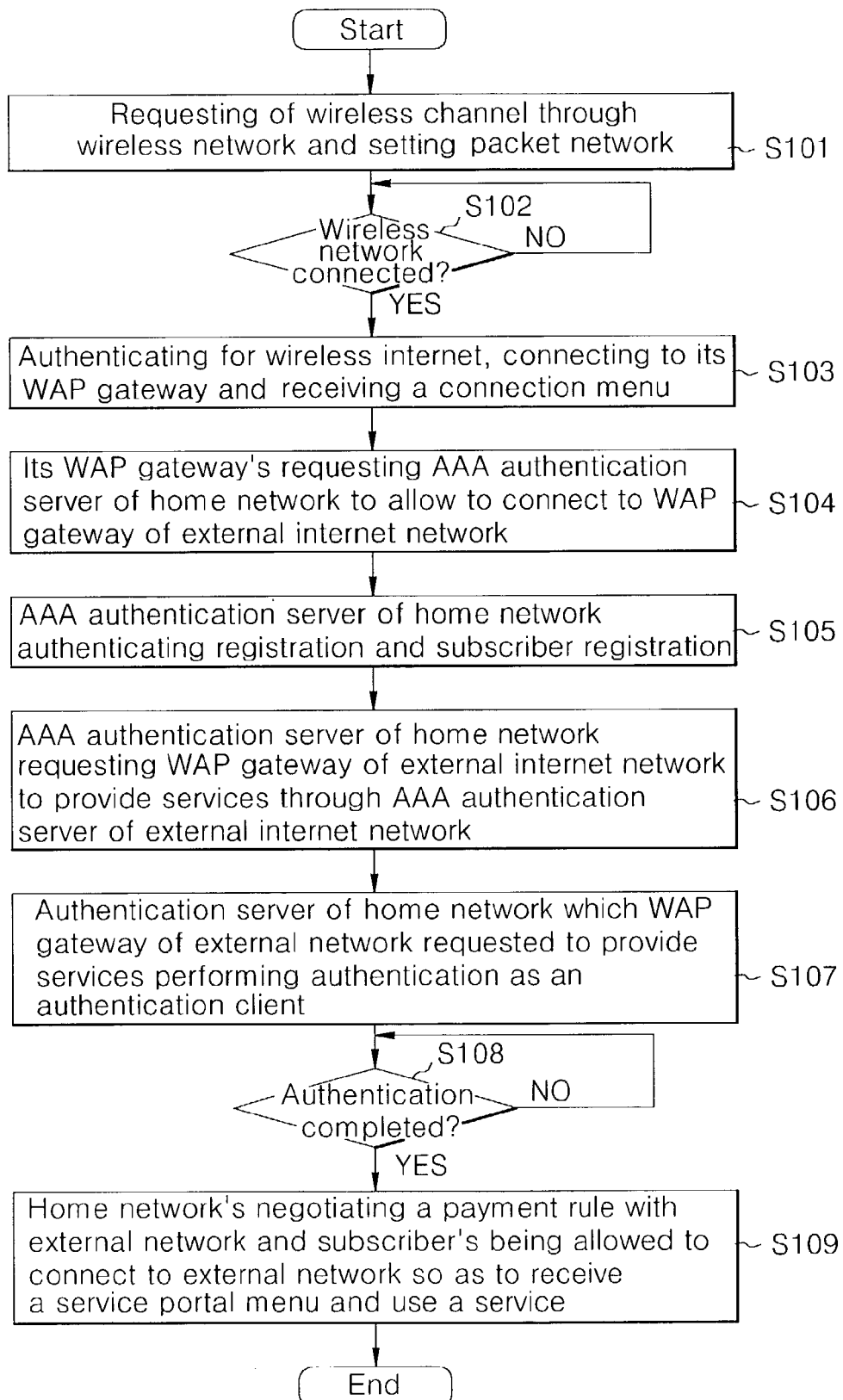

INTER-WORKING METHOD OF WIRELESS INTERNET NETWORKS (GATEWAYS)

BACKGROUND OF THE INVENTION

1. Field of the Invention

This invention relates to inter-working method of wireless Internet (gateways) such as cellular, PCS and IMT-2000. It focuses on inter-working method that can support Internet service provided by foreign-wired network service provider including foreign mobile Internet service provider or foreign wireless Internet portal service provider who has wireless Internet contents. (Network of subscribed mobile service provider is referred to as the home domain, and the other network referred to as foreign)

2. Background of the Prior Art

When the subscribers are intended to be provided with wireless Internet service using mobile terminals, the mobile communications service providers authenticate the subscribers for data service by means of inter-working function (IWF) or a packet data service node (PDSN) and authentication server. The subscriber's terminal is connected to a wireless Internet portal gateway of the mobile communications provider by default when the subscriber's terminal requests to connect wirelessly to Internet again. Only the services of contents providers connected directly (not through wireless Internet gateway) to the mobile communications providers are provided according to provided wireless internet menus. That is, the current subscribers who need inter-working with providers, and opening of wireless network can be provided only with the contents connected directly to the mobile communications provider. As a result, inter-working service between networks is hindered to be spread out since there is not any solution to proper authentication, authorization, accounting, and so on for network inter-working.

Besides policy problems, the approval for mobile electronic commercial trade is exposed to the Internet. In conversion of wireless-based security to wire-based security (ex. WTLS→TLS) and the opposite conversion, security problems may rise at the wireless Internet gateway, which does not allow the traders to put confidence in the trade.

As a solution to security problems of the wireless Internet, a problem of data transmission efficiency within wireless section and the security problem can be solved at once if the mobile electronic commercial trade related contents portal providers manage the wireless Internet gateway directly.

However, in this management, authentication between the gateway servers, authorization, accounting management, etc. should precede in order to successfully inter-work with other networks (wireless Internet gateways of the mobile electronic commercial trade related contents providers) which subscribers want from the mobile communications providers. In other words, the subscribers could not inter-work with the wireless Internet gateways of either the other mobile communications providers outside of the mobile communications provider or the wired and wireless portal providers because its wireless Internet gateway (or proxy) performs protocol conversion, security protocol, and accounting to subscribers. It is because not only a policy problem but also a security and authentication problem, an authorization problem, a accounting problem, etc. arise in technology when interworking with the wireless Internet gateways at the same level. The conventional server-client type RADIUS (Remote Access Dial In User Service) is used usually in connection to wire Internet and has not be applied to the wireless Internet gateway. It can only authenticate the subscriber who connects to the mobile communications providers and cannot be applied to the wireless Internet gateway in the aspect of structure. The RADIUS is an old-fashioned authentication server for the relation between a server and clients and not an authentication server between networks.

Now DIAMETER protocol is described in brief The next generation AAA (Authentication, Authorization, and Accounting) protocol is the DIAMETER. The DIAMETER based AAA is a last draft state of IETF. The characteristics of the DIAMETER are described as follows.

First, it is server-to-server based operation. DIAMETER clients are network access server or router, Foreign Agent and Home Agent of Mobile IP protocol. And DIAMETER servers are AAAF(AAA server of Foreign) server, AAAB (AAA server of Broker) server and AAAH(AAA server of Home) server in multi-domain network.

Second, the whole communications between DIAMETER clients and server are encrypted and signed by means of a CMS(cryptograph message syntax) and a digital signature that is based on public key mechanism. In addition, the user's passwords included in DIAMETER message are encrypted to protect from hackers.

Third, the whole communications between DIAMETER server to server are authenticated by means of a security association of public key based.

Last, DIAMETER messages are encoded into Type-Length-Value field called Attribute or Attribute/Value Pair to deliver AAA information. Attribute is, for example, user's name(NAI), user's password and so forth.

As previous protocols, access is not possible across the among mobile Internet service provider's gateway (Example: WAP gateway) and mobile portal service provider's gateway which are provide portal service in foreign mobile Internet service provider's gateway. The RADIUS and DIAMETER application protocols have not been used in such wireless Internet networks to date. The protocols for the AAA service are required to support it among mobile Internet service provider's gateway and mobile portal service provider's gateway in the way to inter-working but the previous protocols described above cannot satisfy the requirement.

The protocol DIAMETER based proposed invented inter-working method has been developed to overcome the above-described problems. The DIAMETER protocol can be defined to be a light but expendable peer-based AAA protocol for AAA service for new policy, conventional technology such as PPP, and innovative technology such as roaming and mobile IP. The DIAMETER supports the greater length of the Attribute/Value. A DIAMETER server can transmit messages that a NAS can process, and support watch-dog communication-based transport that is fault-tolerant and reliable.

The DIAMETER is being employed as a next generation standard for authentication, authorization and accounting in the world at the time of this writing.

SUMMARY OF THE INVENTION

Accordingly, the present invention is directed to overcome the problems of the conventional art.

It is an object of the present invention to give solutions to the problems of mutual authentication, authorization and accounting through authentication servers of the wireless Internet service providers so as to share the contents subjected to and provided by the wireless Internet service providers in mobile communication systems.

It is another object of the present invention to employ an AAA authentication server DIAMETER in authentication between networks in order to overcome the problems of wireless Internet authentication between networks, authorization and accounting. (The DIAMETER server as network-network authentication server is now at the beginning of development for standardization, and has not yet included application to wireless Internet or authentication of wireless Internet gateways.)

It is another object of the present invention to use broker networks to inter-work communications providers with wireless Internet portal providers and further to inter-work mobile communication networks with wireless Internet network in the world.

To accomplish the above objects, the present invention provides an inter-working method of wireless Internet (gateways) comprising the steps of: (a) requesting wireless channel for a wireless network and setting packet network so that data service is provided with; (b) when a subscriber connects to wireless network, authenticating the wireless Internet, connecting to WAP gateway thereof, receiving a connection menu, and requesting connection to a WAP gateway of external wireless Internet by means of Internet from its WAP gateway to an AAA authentication server of a home network; (c) performing a registration authentication including negotiation process and a subscriber' registration authentication at the AAA authentication server of the home network; (d) if authentication is completed, requesting a service to a WAP gateway of an external network through an AAA authentication server of the external network at the AAA authentication server of the home network; (e) performing authentication process at a authentication client of an authentication server of the home network which is requested the service by the WAP gateway of the external network; and (f) if the authentication process is completed negotiating a way of accounting between the home network and the external network, granting access to the network to receive a service portal menu and to provide service.

The step (c) comprises the step (c-1) of negotiating registration authentication with a corresponding mobile communications provider network of a subscriber at the WAP gateway of the external network before the subscriber connects to the mobile communications provider network according to a policy.

The step (c) further comprises the step (c-2) of transmitting subscriber registration request and accounting information messages to connected subscribers in the case that registration authentication is already completed between the WAP gateway of the external network and the mobile communications provider network, so that communication is performed between networks, and the step (d) comprises encrypting, based on public key of electronic signature, messages transmitted in a message digest process when secure message transmission and reliability are required, the whole messages transmitted between the AAA authentication server of the home network and an AAA authentication server of the external network being AVP.

The step (c-1) comprises the step (c-1-1) of transmitting and receiving information on principal connection protocol, identifying an object ID, and reporting its supportable functions to each other thereby defining concrete service specification when connecting transmission layer to each other, and the step (c-1) further comprises the step (c-1-2) of negotiating with the WAP gateway of the mobile communications provider network of the subscriber at the WAP gateway of a visiting network through an AAA authentication server of the visiting network and the AAA authentication server of the home network.

The step (c-1-2) comprises the steps of: (c-1-2-1) connecting a lower level of the mobile communications provider network at the WAP gateway of the visiting network through AAA authentication server of the visiting network; (c-1-2-2) transmitting a mutual function negotiation message through a protocol of a low level of connected Internet, and (c-1-2-3) receiving responses to confirm function negotiation of each other, wherein the function negotiation messages in step (c-1-2) include at least one selected from the group of authentication protocol and application protocol versions, supportable terminal browser types, push function supportability, authentication algorithm, security message supportability, and transmission protocol type, wherein authentication algorithm include at least one selected from the group of key encryption algorithm, signature algorithm, message digest algorithm, encryption/decryption algorithm.

To accomplish the above objects, the present invention provides a recording medium storing a program composed of instructions to be executed and read by a digital processing unit so as to perform an inter-working method of wireless Internet (gateways), the recording medium containing a plurality of computer instructions to cause on or more computers to: request wireless channel for a wireless network and set packet network so that data service is provided with; when a subscriber connects to wireless network, authenticate the wireless Internet, connect to WAP gateway, receive a connection menu, and request connection to a WAP gateway of external wireless Internet by means of Internet from its WAP gateway to an AAA authentication server of a home network; perform a registration authentication including negotiation process and a subscriber' registration authentication at the AAA authentication server of the home network; if authentication is completed, request a service to a WAP gateway of an external network through an AAA authentication server of the external network at the AAA authentication server of the home network; perform authentication process at a authentication client of an authentication server of the home network which is requested the service by the WAP gateway of the external network; and if the authentication process is completed, negotiate a way of accounting between the home network and the external network, grant access to the network to receive a service portal menu and to provide service.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the present invention. In the drawings:

FIG. 6 is a flowchart of an inter-working method of wireless Internet (gateways) according to the present invention.

DETAILED DESCRIPTION OF THE PREFERRED EMBODIMENTS

Descriptions will now be made in detail to a preferred embodiment of an interworking method of wireless Internet (gateways) of the present invention with reference of accompanied drawings.

Figure 1:
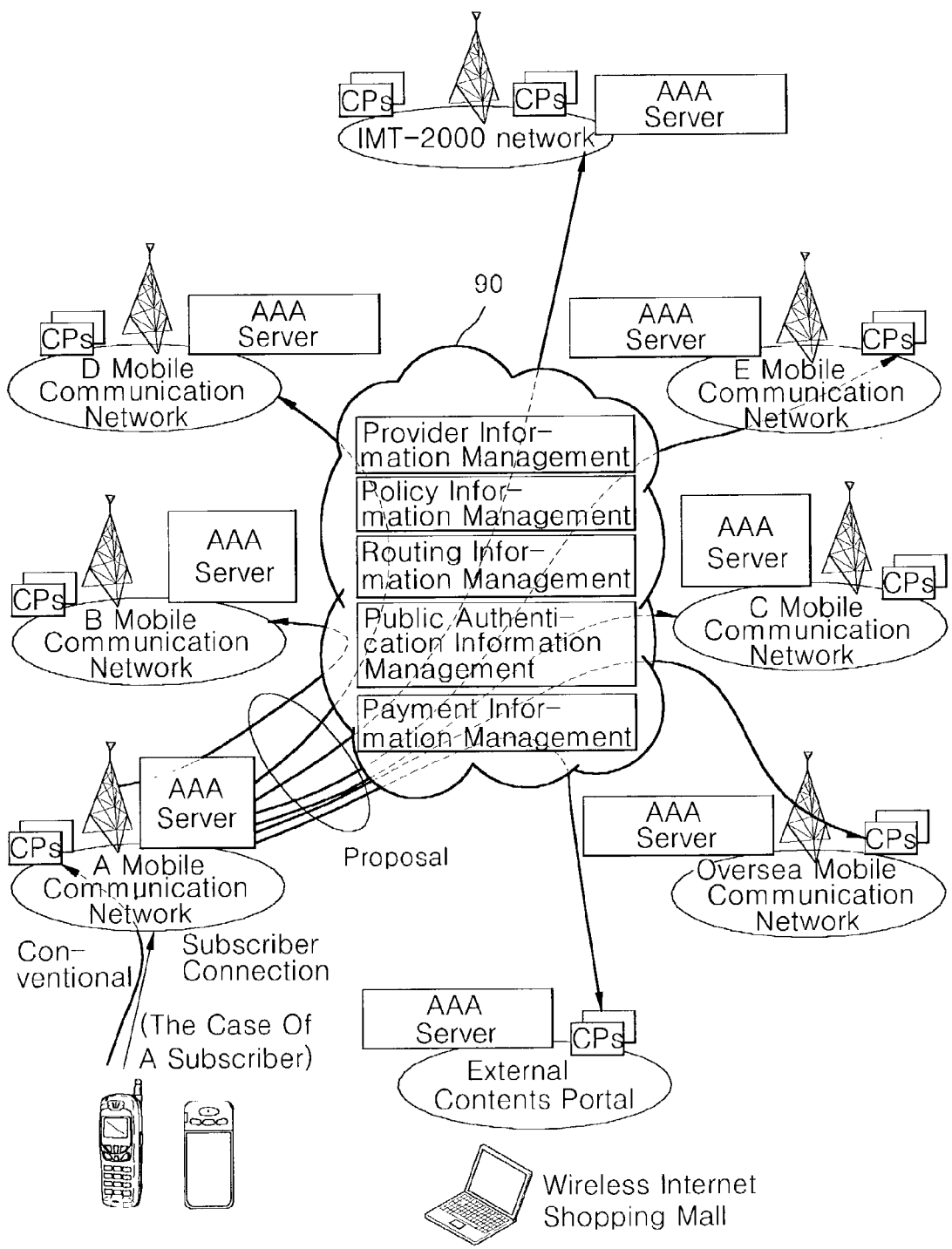
FIG. 1 illustrates a mechanism of inter-working with wireless Internet networks.

FIG. 1 illustrates a mechanism of inter-working with wireless Internet networks(gateways). In the case that a subscriber tries to connect to the network other than the network of the mobile communication provider of the subscriber, for example, the 001 mobile communication subscriber tries to connect to the network such as "A", "B", "C", "D" or IMT-2000 network in order to use contents service, the subscriber can connect to the external networks through a broker network 90 so as to use their provided service. The broker network 90 carries out provider information management, policy information management, routing information management, authentication information management, accounting information management and so on.

Most of all, first authentication is performed for data call connection through packet service network (PDSN or IWF) for data call connections by connecting mobile communication provider with wireless network. After authentication of subscriber who is intended to connect, if a wireless Internet connection menu is chosen to use wireless Internet service according to the menu the provider displays, a connection authority is switched from packet service network to wireless Internet gateway.

Figure 2:
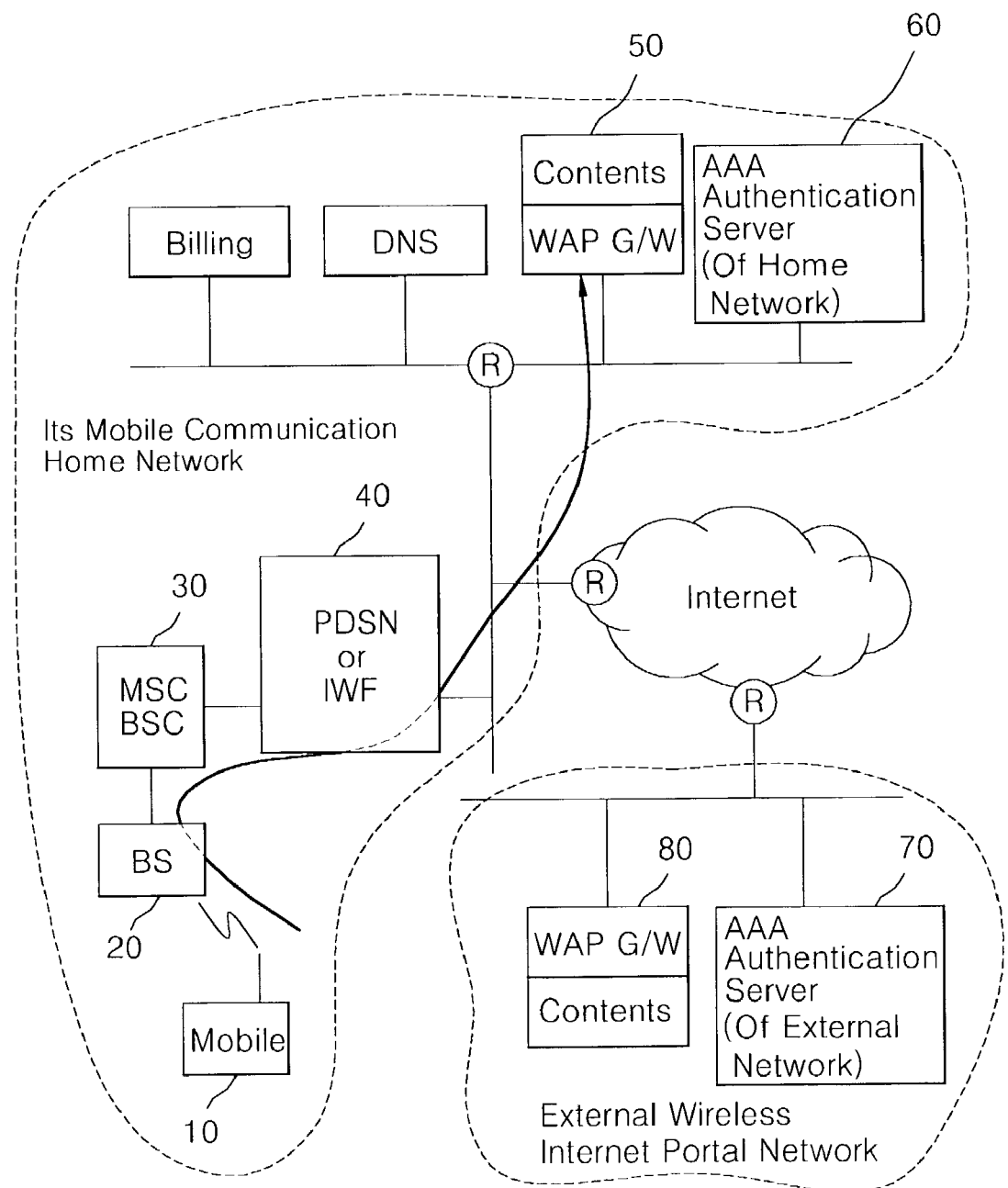
FIG. 2 illustrates a mechanism of authentication between wireless Internet networks.

Considering FIGS. 1 and 2 which illustrate network structure of mobile communication providers, an external network may be one of the networks of other mobile communication providers. In other words, if a subscriber uses wireless Internet service of a mobile communication provider, it is not necessary to authenticate in addition specially and it is only required to process accounting according to the record of accounting of wireless Internet gateway.

However, as shown in FIG. 1, if the service that the subscriber wishes to be provided with is not the contents service that the mobile communication provider does not provide but the contents that any third wireless Internet portal provider provides, authentication is performed inter-working with the networks of mobile communication providers, and processed are such as authorization process, accounting process and so on in the present invention. To do this, change of connection method and negotiation in which protocols of wireless Internet gateway and performance information are sent and received when connected should proceed inter-working with networks. In other words, necessary contents network can have been authenticated by service providers inter-working with each other before a subscriber requests authentication to inter-work with networks. In this process, a broker network can be used and be set or shared as separate network. If service of inter-working with networks can be supported, defined is an authentication certificate issuing system for end-to-end authentication between wireless Internet gateway 50 to which a subscriber wants to connect and authentication server 60 of mobile communication provider which is initially connected, and mutual authentication is accomplished. And further wireless Internet gateway mentioned in the present invention corresponds to server inter-working directly with GUI expressed in wireless terminal for inter-working of wire and wireless network and means network element implementing contents conversion etc. For example, it can be WAP gateway or proxy in WAP protocol and inter-working server of different name in other protocol except them. For understanding, the wireless gateway is explained to WAP gateway in the present invention.

Figure 3:
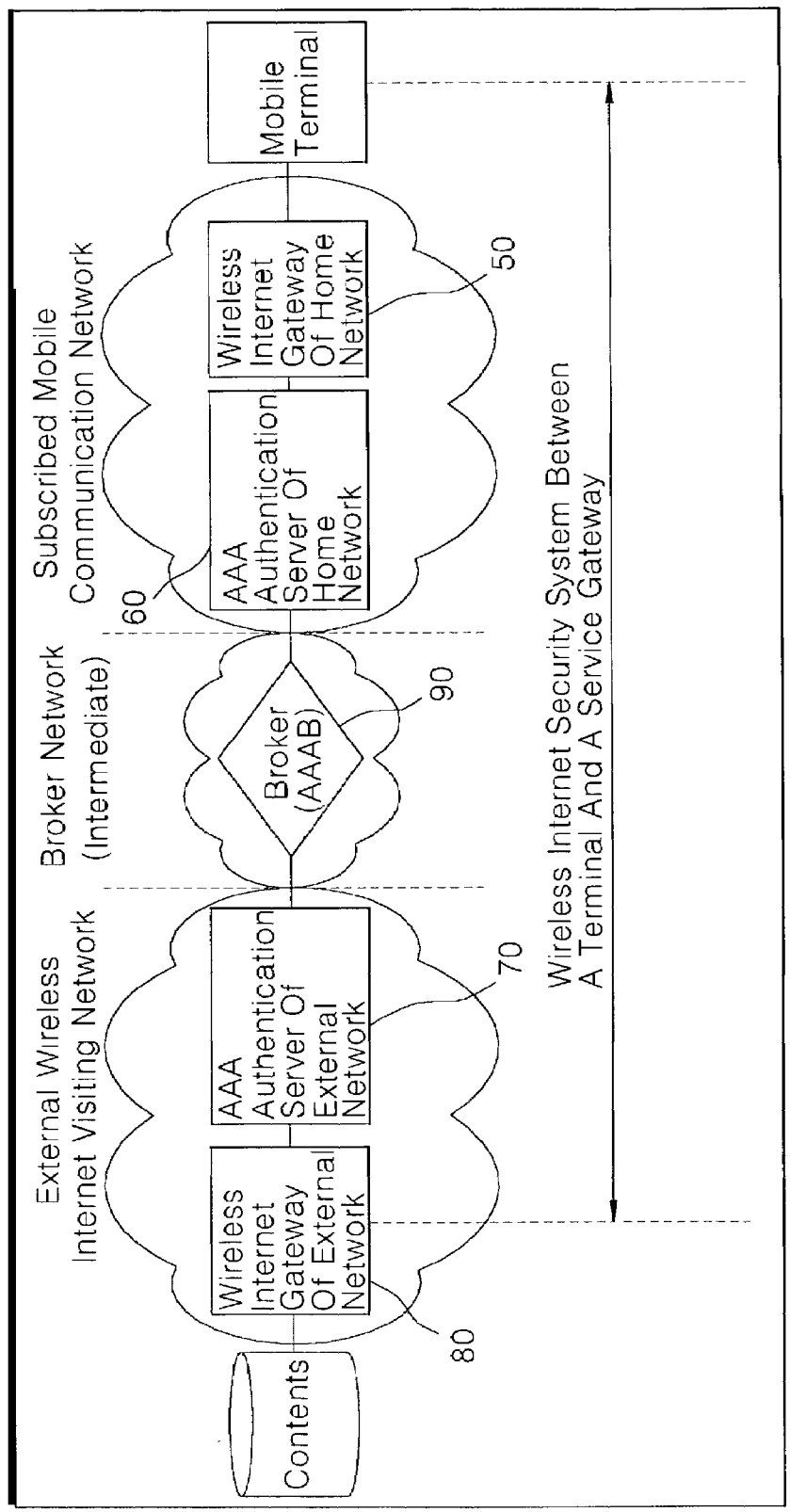
FIG. 3 illustrates a structure of a service network by which security is guaranteed in wireless Internet.

FIG. 3 illustrates a structure of inter-working with networks using a broker network which connects providers one another. That is, as shown in FIG. 3, a broker network 90 is used to form a network. The broker network 90 connects mobile communication providers to wireless Internet providers having wireless Internet gateway. This broker network 90 puts together information on many connected providers, manages it, manages such as supported service types and protocols, and provides information on service policy and security policy. It is because there are various wireless Internet protocols and accounting depends on service. This broker network 90 finds the requested object server for this inter-working service and transfers policy information such as supply ability negotiation, authentication, security, accounting and service quality to makes the requested service to be possible.

In home network which a mobile subscriber is connected to, an AAA server is used to perform authentication of wireless Internet gateway, authorization and accounting. The home network AAA authentication server 60 does not correspond to the subscriber authentication server for mobile IP connection in the other network for the subscriber's moving that has been used but corresponds to the AAA authentication server to inter-work with the networks which provide external wireless Internet service after the subscriber connects to mobile communication provider network of the subscriber.

Authentication is the function to prove these facts or confirm them. When connected using wireless terminal to provide authentication service in wireless Internet, an authentication certificate is issued by wireless Internet gateway 50. The new authentication certificate issue system needs an authentication certificate form to store and manage. Owing to such a mechanism, a wireless Internet gateway of external network which a subscriber wants to connect to inter-works with an AAA authentication server 60 of a mobile communication provider which performed authentication at its first connection through an AAA authentication server 70 (via an authentication server of a broker network if possible). A wireless Internet gateway of a mobile communication provider for the first connected home network confirms the authentication certificate and transfers it to a wireless Internet 80 of an external network. As a result, mutual authentication is achieved.

Consider the case that a subscriber tries to connect to an external network that has contents. First, a wireless Internet gateway 50 of home network is authenticated by an authentication server 60 of home network. The subscriber then requests a wireless Internet gateway 80 of an external network to allow connection. The requested portal wireless Internet gateway 80 of the external network then provides the subscriber with a new browser suitable for the subscriber or menu so as to provide a service. It is assumed that the terminal has multi-browser function or multi-provider menu composition function.

Figure 4:
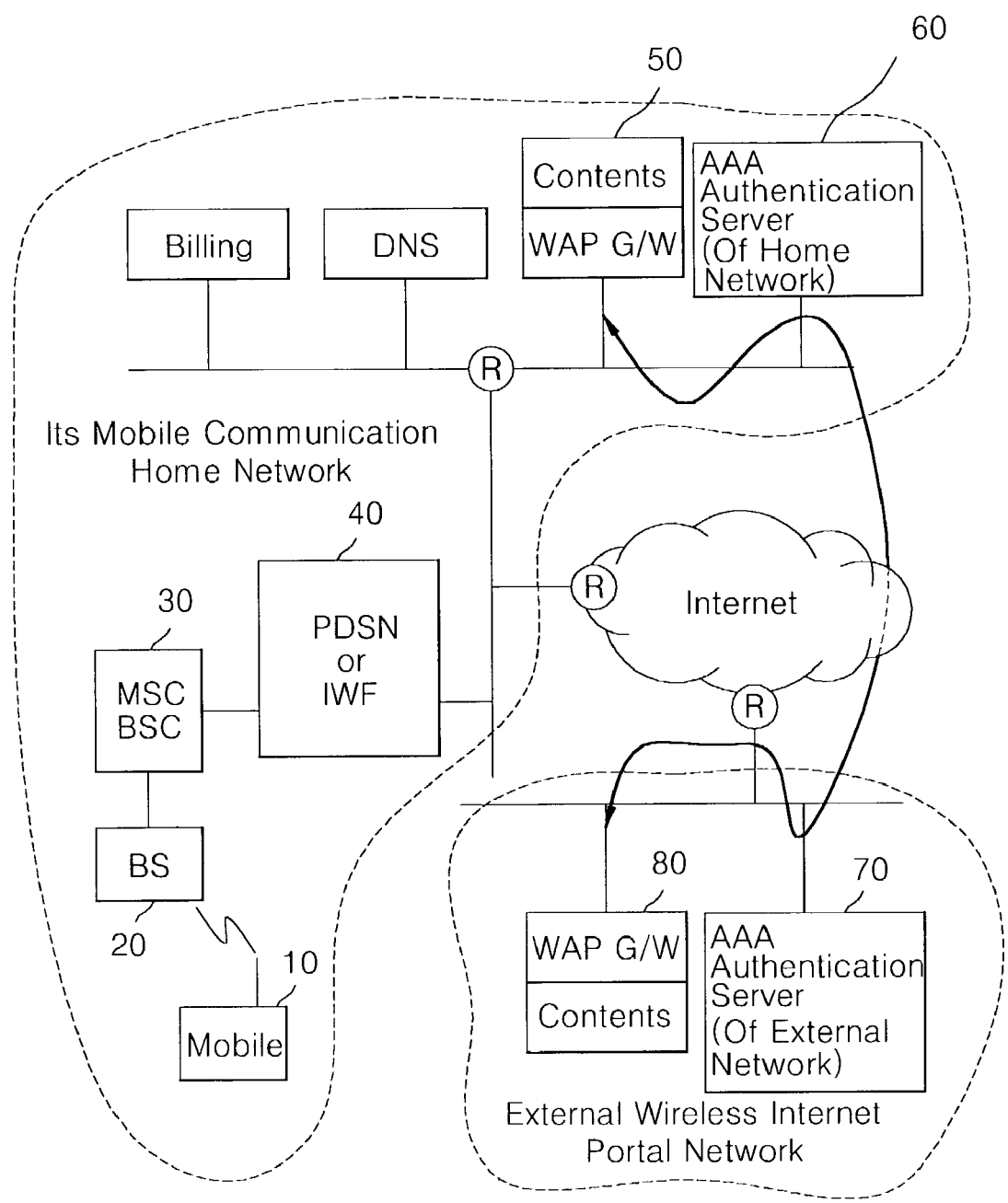
FIG. 4 illustrates a mechanism of authentication between wireless Internet networks according to the present invention.

FIG. 4 illustrates negotiation procedure over supportable capability of wireless Internet networks according to the present invention. In this negotiation procedure, authentication between networks is performed deliberately so as to authenticate only subscribers without additional authentication between networks when requested by the subscriber. Mutually confirmed is the supportable capability of wireless Internet specification provided by network, and service impossible is informed of at beginning to the terminal that requests the service which cannot be provided so as to classify the services that can be provided.

Negotiation procedure can be performed before the terminal requests to connect or before negotiation over a portal site to which a subscriber requests to connect is not performed. In mutual capacity negotiation procedure, exchanged is information on significant connection protocols so as to identify IDs when transport layers are connected with each other. The information on supportable capability is exchanged mutually to define detailed service specification. In negotiation, information on capability is exchanged between a wireless Internet gateway 50 of a mobile communication provider and another wireless Internet gateway. The information is transferred through AAA authentication server 70 (of visiting network) and AAA authentication server 60 (of home network). Transmission protocols are transmitted using SCTP (Stream Control Transmission Protocol; not shown in drawings) or conventional TLS (Transport Layer Security; not shown in drawings) for the sake of security.

Referring to FIG. 4, wireless internet gateway(ex. WAP gateway) 80 of a visiting network (an external network) connects to the lower level belonging to a mobile communication provider through an AAA authentication server 70 of the visiting network. Capability negotiation message is transmitted to each other using lower level protocols of the connected Internet so as to confirm capability of each other based on the response from each other. In this case, parameters of the negotiation are the followings.

First, versions of an authentication protocol and an application protocol

Second, a type of a supportable terminal browser

Third, supportability of push function

Fourth, authentication algorithm (key encryption algorithm, signature algorithm, message digest algorithm, encryption and decryption algorithm)

Fifth, other transmission protocol types

Such a service is termed "external wireless Internet connection service" or "wireless Internet roaming service". The process of the service, that is, the procedures of an inter-working method of wireless Internet (gateways) according to the present invention will be described referring to accompanied FIG. 5 as follows.

Figure 5:
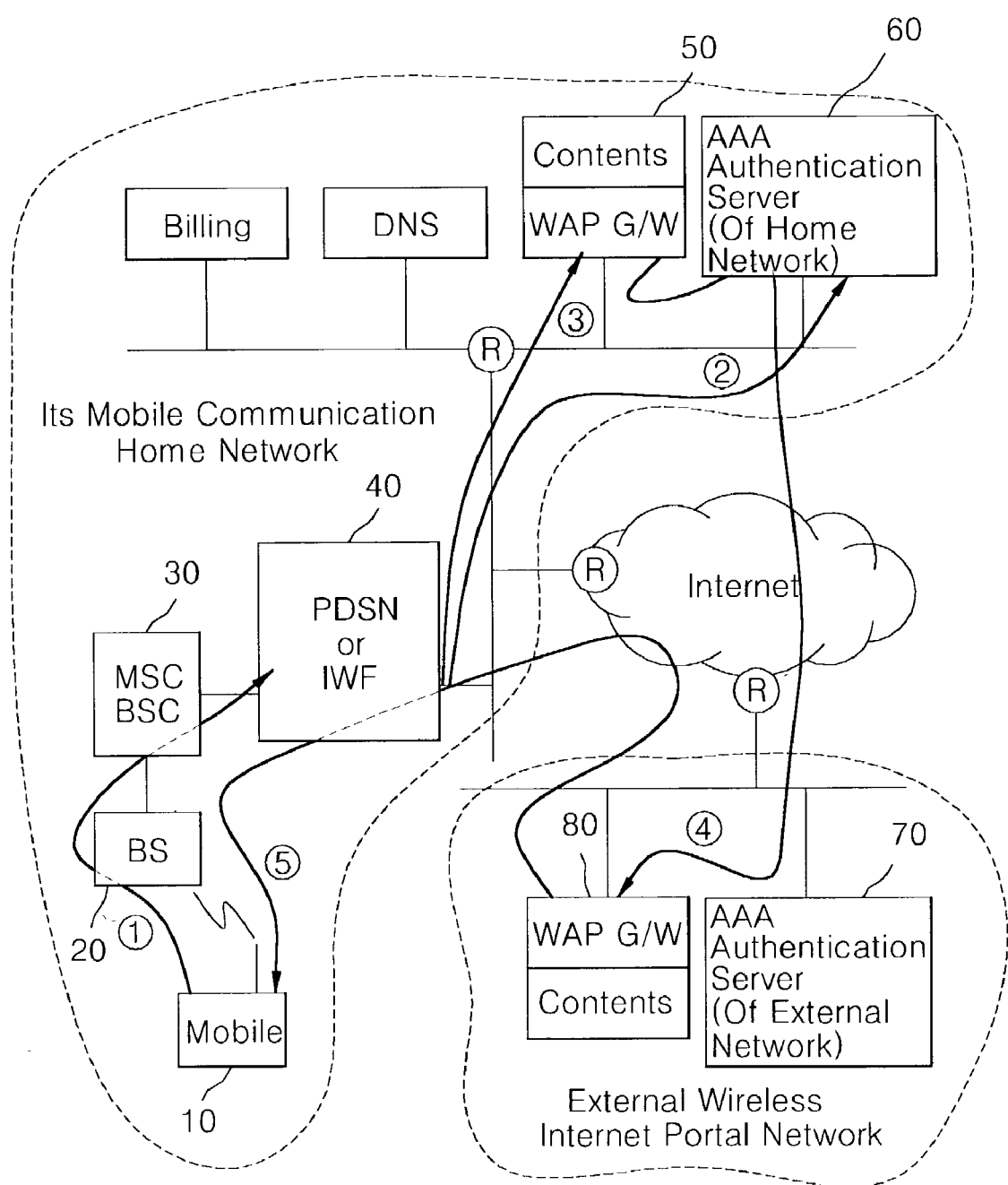
FIG. 5 illustrates procedures of an inter-working method of wireless Internet (gateways) according to the present invention.

FIG. 5 illustrates procedures of an inter-working method of wireless Internet (gateways) according to the present invention. The description begins with the procedure of requesting wireless Internet channel and setting a packet network through wireless network to use data service. A mobile subscriber 10 requests base stations 20 and 30 to allocate a wireless channel to itself 10. Wireless Internet service call is set and a mobile subscriber 10 receives an IP address for wireless Internet through a packet network (PDSN) or a circuit network (IWF) 40. The mobile subscriber 10 connects to a AAA authentication server 60 of a home network and use wireless Internet service (depicted by ① in FIG. 5).

Subsequently, after connection to wireless networks, the mobile subscriber 10 is authenticated for wireless Internet and connects to its wireless internet gateway(ex. WAP gateway) 50 through a given menu to use wireless Internet service. A wireless Internet protocol is then set and a wireless Internet menu is given again (depicted by ③ in FIG. 5).

Next, the mobile subscriber 10 receives a connection menu and request an external wireless network to allow connection. That is, the mobile subscriber 10 does not request the wireless Internet network of its mobile communication provider but requests one of other wireless Internet networks to allow connection. The wireless Internet gateway, that is, WAP G/W 50 requests an AAA authentication server 60 of home network to allow connection to external networks in order that the mobile subscriber 10 shifts to a portal site which is requested connection by the mobile subscriber 10.

An AAA authentication server 60 authenticates registration of WAP G/W 50. At the same time, subscriber's registration is also authenticated (including negotiation).

However, a wireless Internet gateway 80 of an external network (a visiting network) can perform registration authentication with mobile communication provider according to a policy before subscriber's connection. In this case, connection can be maintained with the given condition by mutual connection. When a subscriber connects to the external network, additional authentication between servers is not necessary since they remain connected because of a state machine between server nodes. The requesting subscribers' communications between networks are achieved by a subscriber registration request and a accounting information message.

In transmitting and receiving all information via an AAA server, messages transmitted and received by message digest procedure can be encrypted based on public key of electronic signature in the case of requiring reliability of message transmission between authentication nodes as AVP. At this time, it can be referred to as the above-described service name that the subscriber uses in authentication and registration at an external network.

Subsequently, it is not the gateway of the network to which the subscriber shifted but the gateway 50 of a home network that calls the gateway 80 of an external network. The AAA authentication server 60 request wireless Internet gateway 80 to provide services through the AAA authentication server of the external network. The gateway of the network desired to connect is authenticated. The wireless Internet gateway 80 of an external network (a visiting network) performs authentication procedure as authentication client of authentication server 60 of a home network as shown in FIG. 5. After authentication procedure, information on accounting rules is transmitted and received to negotiate accounting rules in order to start to provide service after authentication of an external network and authorization. When the accounting rule negotiation is finished, sessions for subscribers are managed and networks begin to inter-work with each other in order to provide service to the connected subscriber.

Thus, the subscriber can receive service portal menu from an allowed network and use provided services. In other words, the subscriber receives new browser or new menu from a visiting network to use services. Such a procedure of inter-working with networks does not depend on whether an exclusive line to other networks is used or public Internet network is used. As a result, the subscriber can use various services after connection is completed While service is provided, an AAA authentication server 70 of a wireless Internet portal (visiting) network transmits accounting information to an AAA authentication server 60 of a home network periodically. After service is completed, accounting complete message is transmitted to complete accounting process.

Referring to FIG. 6, an inter-working method of wireless Internet (gateways) according to the present invention will be described step by step. FIG. 6 is a flowchart of an inter-working method of wireless Internet (gateways) according to the present invention.

A subscriber requests a wireless channel through a wireless network and sets packet network in order to use data service (S101). It is determined that the subscriber is connected to a wireless network (S102). Authentication for wireless Internet is performed and the subscriber connects to its wireless internet gateway(ex. WAP gateway) to receive a connection menu (S103). Its wireless internet gateway(ex. WAP gateway) of home network requests a wireless internet gateway(ex. WAP gateway) of an external wireless Internet network to allow connection through a AAA authentication server via Internet (S104). The AAA authentication server of a home network performs registration authentication including negotiation and authentication of subscriber (S105).

In S105, the WAP gateway of an external network negotiates registration authentication with the mobile communication provider network of the subscriber according to policy before the subscriber connects to an external network. In the case that the WAP gateway of the external network has already completed negotiation of registration authentication with the mobile communication provider network, the wireless internet gateway(ex. WAP gateway) of the external network transmits subscriber registration request message and accounting information message to the mobile communication provider network of the subscriber to accomplish communication between networks. When the wireless internet gateway(ex. WAP gateway) of an external network negotiates registration authentication with the mobile communication provider network of the subscriber, the WAP gateway of the external network transmits and receives information on significant connection protocol to and from the mobile communication provider network of the subscriber, identifies ID and exchange information on supportable capability with each other in connecting the transport layers to each other so as to define detailed service specification. The negotiation of registration authentication is performed between the wireless internet gateway(ex. WAP gateway) of the mobile communication provider network of the subscriber and the wireless internet gateway(ex. WAP gateway) of a visiting network through an AAA authentication server of the visiting network and an AAA authentication server of the home network.

The wireless internet gateway(ex. WAP gateway) of the visiting network connects to a lower level of the mobile communication provider network through the AAA authentication server of the visiting network, transmits capability negotiation messages mutually to the mobile communication provider network by a protocol for lower level of connected Internet and receives the response to confirms mutual capability negotiation. The capability negotiation messages include at least one of authentication protocol and application protocol versions, supportable terminal browser types, push function supportability, authentication algorithm, security message supportability, and transmission protocol type. The authentication algorithm is at least one of key encryption algorithm, signature algorithm, message digest algorithm, and encryption/decryption algorithm.

The AAA authentication server of the home network requests the WAP gateway of the external network to provide service through the AAA authentication server of the external network, when the registration authentication including negotiation and the subscriber registration authentication is completed (S106). The authentication server of the home network which the WAP gateway of the external network requested to provide services performs authentication as an authentication client (S107). When the authentication is completed (S108), the home network negotiates a accounting rule with the external network and the subscriber is allowed to connect to the external network so as to receive a service portal menu and use a service (S109).

In the inter-working method of wireless Internet (gateways) according to the present invention described above, DIAMETER which is the first version of the standard of mobile IP is applied to the application scenario based on wireless Internet gateway of a home network, not on FA or HA. After all mobile communication providers connect to wireless Internet, subscribers are not bounded to the network of their mobile communication provider and have the freedom to select any wireless Internet portal site and use the service of it. Such a wireless Internet connection method will make wireless Internet contents popular in the open wireless network epoch and provide wireless Internet contents providers with an excellent chance.

The authentication of the wireless Internet gateways of other networks, authorization, accounting management, structures and techniques proposed by the present invention can give solutions to security problems of wireless internet gateway(ex WAP G/W) that have not overcome, and provide reliability to wireless Internet electronic commercial trade service.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An inter-working method of wireless Internet gateways comprising the steps of:
   (a) requesting a wireless channel of a wireless network and configuring a packet network to provide data service;
   (b) when a subscriber connects to the wireless network, authenticating the wireless Internet, connecting to wireless internet gateway(ex WAP gateway) thereof, receiving a connection menu, and requesting connection to a wireless internet gateway(ex WAP gateway) of external wireless Internet by means of Internet from its wireless internet gateway(ex WAP gateway) to an AAA authentication server of a home network;
   (c) performing a registration authentication including a negotiation process and a subscriber registration authentication at the AAA authentication server of the home network;
   (d) upon registration authentication, requesting, at the AAA authentication server of the home network, a service to a wireless internet gateway(ex WAP gateway) of an external network through an AAA authentication server of the external network;

(e) negotiating registration authentication with a corresponding mobile communications provider network of a subscriber at the WAP gateway of the external network before the subscriber connects to the mobile communications provider network according to a policy, transmitting and receiving information on principal connection protocol, identifying an object ID, and reporting supportable functions thereof to each other thereby defining concrete service specification when connecting transmission layer to each other;

(f) performing authentication process at an authentication client of an authentication server of the home network which is requested the service by the wireless internet gateway(ex WAP gateway) of the external network; and (g) if the authentication process requested from the external network is completed, negotiating a way of accounting between the home network and the external network, granting access to the network to receive a service portal menu and a new menu from the external network granted access and to provide service by using the menus.

2. The inter-working method of wireless Internet (gateways) as claimed in claim 1, wherein the step (c) further comprises transmitting subscriber registration request and accounting information message to connected subscribers in case registration authentication is already completed between the wireless internet gateway(ex WAP gateway) of the external network and the mobile communications provider network, so that communication is performed between networks.

3. The inter-working method of wireless Internet (gateways) as claimed in claim 1, wherein the step (d) comprises encrypting, based on public key of electronic signature, messages transmitted in a message digest process when secure message transmission and reliability are required, the whole messages transmitted between the AAA authentication server of the home network and an AAA authentication server of the external network being AVP.

4. The inter-working method of wireless Internet (gateways) as claimed in claim 1, wherein the step (e) further comprises the step (e-1) of negotiating with the WAP gateway of the mobile communications provider network of the subscriber at the WAP gateway of a visiting network through an AAA authentication server of the visiting network and the AAA authentication server of the home network.

5. The inter-working method of wireless Internet (gateways) as claimed in claim 4, wherein the step (e-1) comprises the steps of:
 (e-1-1) connecting a lower level of the mobile communications provider network at the WAP gateway of the visiting network through AAA authentication server of the visiting network;
 (e-1-2) transmitting a mutual function negotiation message through a protocol of a low level of connected Internet, and
 (e-1-3) receiving responses so to confirm function negotiation of each other.

6. The inter-working method of wireless Internet (gateways) as claimed in claim 5, wherein the function negotiation messages in step (e-1) comprise at least one selected from the group of authentication protocol and application protocol versions, supportable terminal browser types, push function supportability, authentication algorithm, security message supportability, and transmission protocol type.

7. The inter-working method of wireless Internet (gateways) as claimed in claim 6, wherein authentication algorithm comprises at least one selected from the group of key encryption algorithm, signature algorithm, message digest algorithm, encryption/decryption algorithm.

8. A recording medium storing a program composed of instructions to be executed and read by a digital processing unit so as to perform an inter-working method of wireless Internet (gateways), the recording medium containing a plurality of computer instructions to cause one or more computers to:

(a) request wireless channel for a wireless network and set packet network so that data service is provided with;

(b) when a subscriber connects to wireless network, authenticate the wireless Internet, connect to WAP gateway, receive a connection menu, and request connection to a WAP gateway of external wireless Internet by means of Internet from its WAP gateway to an AAA authentication server of a home network;

(c) perform a registration authentication including negotiation process and a subscriber registration authentication at the AAA authentication server of the home network;

(d) if authentication is completed, request a service to a WAP gateway of an external network through an AAA authentication server of the external network at the AAA authentication server of the home network;

(e) negotiate registration authentication with a corresponding mobile communications provider network of a subscriber at the WAP gateway of the external network before the subscriber connects to the mobile communications provider network according to a policy, transmitting and receiving information on principal connection protocol, identifying an object ID, and reporting supportable functions thereof to each other thereby defining concrete service specification when connecting transmission layer to each other;

(f) perform authentication process at an authentication client of an authentication server of the home network which is requested the service by the WAP gateway of the external network; and (g) upon completion of the authentication process, negotiate a way of accounting between the home network and the external network, grant access to the network to receive a service portal menu and a new menu from granted external network and to provide service by using the received menus.

* * * * *